(12) United States Patent
Nordlöf

(10) Patent No.: US 7,005,832 B2
(45) Date of Patent: Feb. 28, 2006

(54) DEVICE FOR A BATTERY CHARGER

(75) Inventor: Peter Nordlöf, Avesta (SE)

(73) Assignee: Creator Teknisk Utveckling AB, Vikmanshyttan (SE)

( * ) Notice: Subject to any disclaimer, the term of this patent is extended or adjusted under 35 U.S.C. 154(b) by 0 days.

(21) Appl. No.: 10/504,970

(22) PCT Filed: Feb. 18, 2003

(86) PCT No.: PCT/SE03/00263

§ 371 (c)(1),
(2), (4) Date: Jan. 10, 2005

(87) PCT Pub. No.: WO03/069760

PCT Pub. Date: Aug. 21, 2003

(65) Prior Publication Data

US 2005/0093515 A1    May 5, 2005

(30) Foreign Application Priority Data

Feb. 18, 2002   (SE) ................................. 0200461

(51) Int. Cl.
*H02J 7/00*   (2006.01)
(52) U.S. Cl. .................................................. 320/121
(58) Field of Classification Search ................ 320/121, 320/106, 146
See application file for complete search history.

(56) References Cited

U.S. PATENT DOCUMENTS

| 4,583,035 A | * | 4/1986 | Sloan .......................... 320/146 |
| 5,319,298 A | | 6/1994 | Wanzong et al. ........... 320/160 |
| 5,644,211 A | | 7/1997 | Tokuyama ................... 320/162 |
| 6,043,625 A | * | 3/2000 | Dowe .......................... 320/160 |

FOREIGN PATENT DOCUMENTS

EP        0 637 119 A2    7/1994

\* cited by examiner

*Primary Examiner*—Pia Tibbits
(74) *Attorney, Agent, or Firm*—Young & Thompson

(57) ABSTRACT

A device for a battery charger, includes connection elements 14, 16 connected to the output lines of the charger, connection elements 16, 24 for connection to the terminals of a battery to be charged. The device includes elements 80 for detecting a voltage over the output lines of the charger, elements 80 for detecting a positive voltage over the terminals of a connected battery, switch elements 60 for connecting at least one of the output lines to the connection elements to the terminals of the battery, and a switch activating element 70 arranged to the voltage detection elements and designed and arranged such that it is capable of activating the switch when a voltage is detected over the output lines of the charger and a positive voltage is detected over the terminals of the connected battery, thereby connecting the charger to the battery.

10 Claims, 2 Drawing Sheets

DEVICE FOR A BATTERY CHARGER

TECHNICAL AREA

Figure 1:
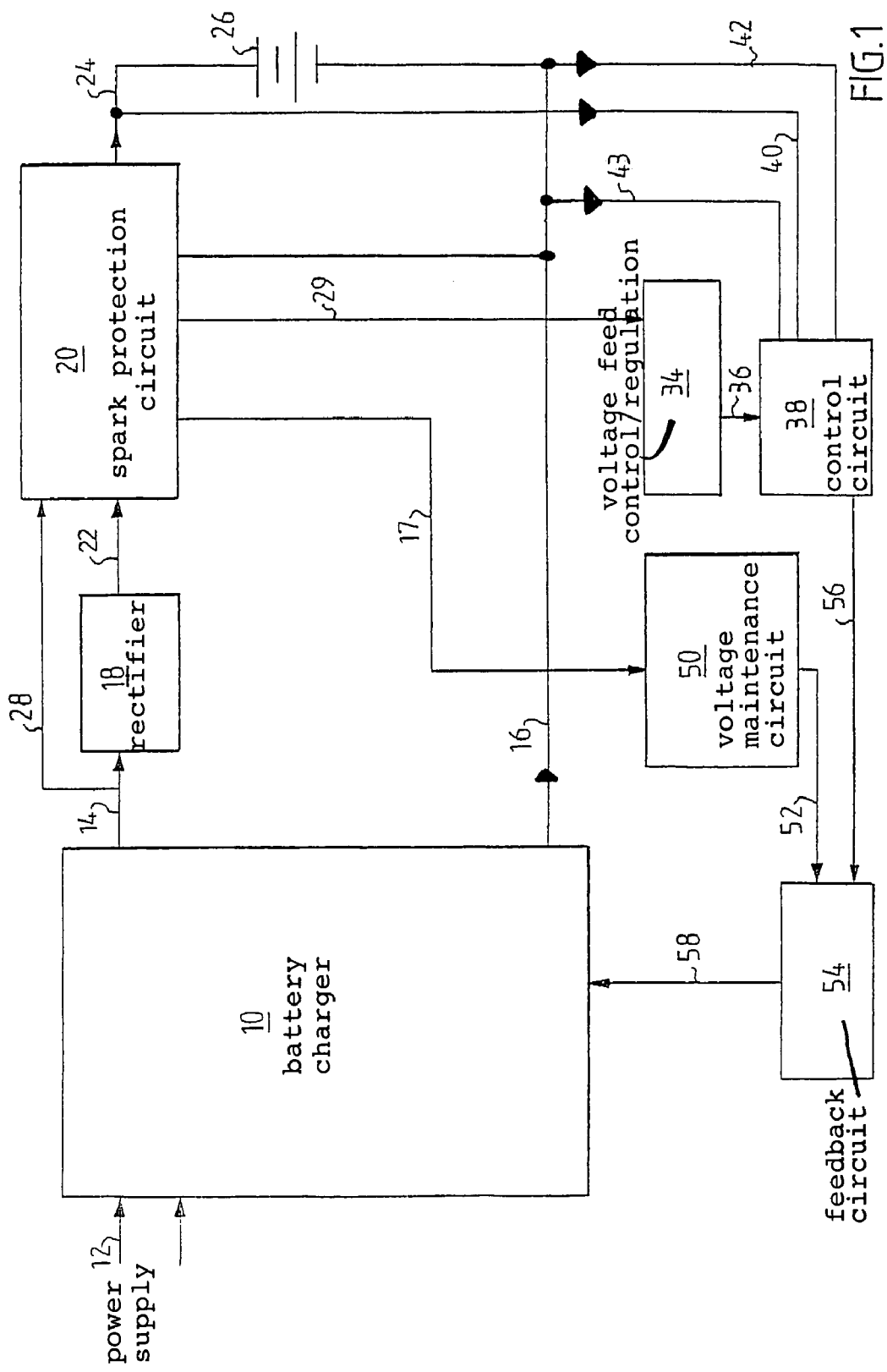

The present invention relates to a device for a battery charger intended for preventing the occurrence of sparks when connected to a battery, and preventing the battery from being drained during interruptions in the power supply. The invention also relates a device which is capable of preventing short-circuiting and that can handle switching of the polarity during connection.

BACKGROUND OF THE INVENTION

Battery chargers are used in a variety of applications for charging wet or dry batteries. When charging wet batteries there is a risk for explosions when connecting the battery charger to the battery since hydrogen gas generated by the electrolyte can explode if ignited by sparks from the connection. This may of course be solved by having the battery charger switched-off during connection, but a user may forget this, and for some applications there is a desire to have an automatic start of the charging process when the battery is connected.

The patent document U.S. Pat. No. 5,045,769 describes a battery charging system where sparking is prevented in that there is a time delay of applying charging current to the battery to allow the battery terminals to be secured. The voltage over the battery terminals is measured and if there is stated that there is a voltage present a delay circuit is activated, which after a certain time, e.g. 2 seconds, closes a switch connecting the charger to the battery. However, should the power supply fail for some reason, there is a risk that the battery is drained because the energy for controlling the spark protection circuit, and also other functions of the charger according to the document is taken from the battery.

SHORT DESCRIPTION OF THE INVENTION

The aim of the invention is to provide a device for a battery charger that prevents the occurrence of sparks when a battery is connected, even if it is done against regulations stating that the battery should be connected before connecting the charger to the power supply, and at the same time prevents the battery from being drained if the power supply is disconnected or is out. In addition the present invention provides additional features due to its design.

Further advantageous developments of the present invention are put forward by the dependent claims.

According to one aspect of the invention it is characterised by a device for a battery charger, comprising connection means connected to the output lines of the charger, connection means for connection to the terminals of a battery to be charged, comprising means for detecting a voltage over the output lines of the charger, means for detecting a positive voltage over the terminals of a connected battery, switching means for connecting at least one of the output lines to the connection means to the terminals of the battery, and a switch activating means arranged to said voltage detection means and designed and arranged such that it is capable of activating the switch when a voltage is detected over the output lines of the charger and a positive voltage is detected over the terminals of the connected battery, thereby connecting the charger to the battery.

According to another aspect of the present invention it is characterised in that said switch activating means comprises a relay and an AND-circuit, which AND-circuit forms a logical condition for activating said relay. Further it comprises a driver for said relay, which driver obtains its driving power from a secondary circuit of the charger.

According to yet another aspect of the invention it is characterised in that it further comprises a support circuit capable of providing auxiliary energy should the battery voltage decrease below a certain threshold value and preferably also that it comprises a support circuit capable of generating and stabilising said auxiliary energy.

The advantages of the present invention are several. Because of the fact that the charger is connected to the battery only if it detects both a voltage from the power supply and a positive voltage from the battery, the charger can never be switched on, ie have a voltage over the connections to the battery, when a battery is connected, even if the charger is already connected to the power supply when the battery is connected. This safely prevents any sparks from occurring when the connections are attached to the battery thereby preventing any sparks during the connection to the battery. Thereby, there is no risk for explosions. Further, since the condition states that the power supply also should be connected, there is no risk of draining the battery if the power supply is cut off.

The design of the device according to the present invention provides additional features and advantages. It prevents short-circuiting of the connections to the battery since the condition that there should be a positive voltage from the battery is not fulfilled, because the terminal voltage becomes close to zero, thereby breaking the connection of the switch. This design also enables protection against switching of terminals since the condition that there should be a positive voltage from the battery is not fulfilled, thereby preventing the switch from closing.

If the battery voltage should decrease to such an extent that the voltage of the spool of the relay is in danger of becoming lower than the holding voltage, the support circuit increases the voltage to the spool. With this design the driving capability of the relay spool is maintained theoretically down to 0 V of the battery.

In all an effective and yet cost-effective device is obtained in comparison with known devices of this type as regards functions and number of components.

These and other advantages of, and aspects of, the present invention will become apparent from the following detailed description and from the accompanying drawings.

SHORT DESCRIPTION OF THE DRAWINGS

Figure 2:
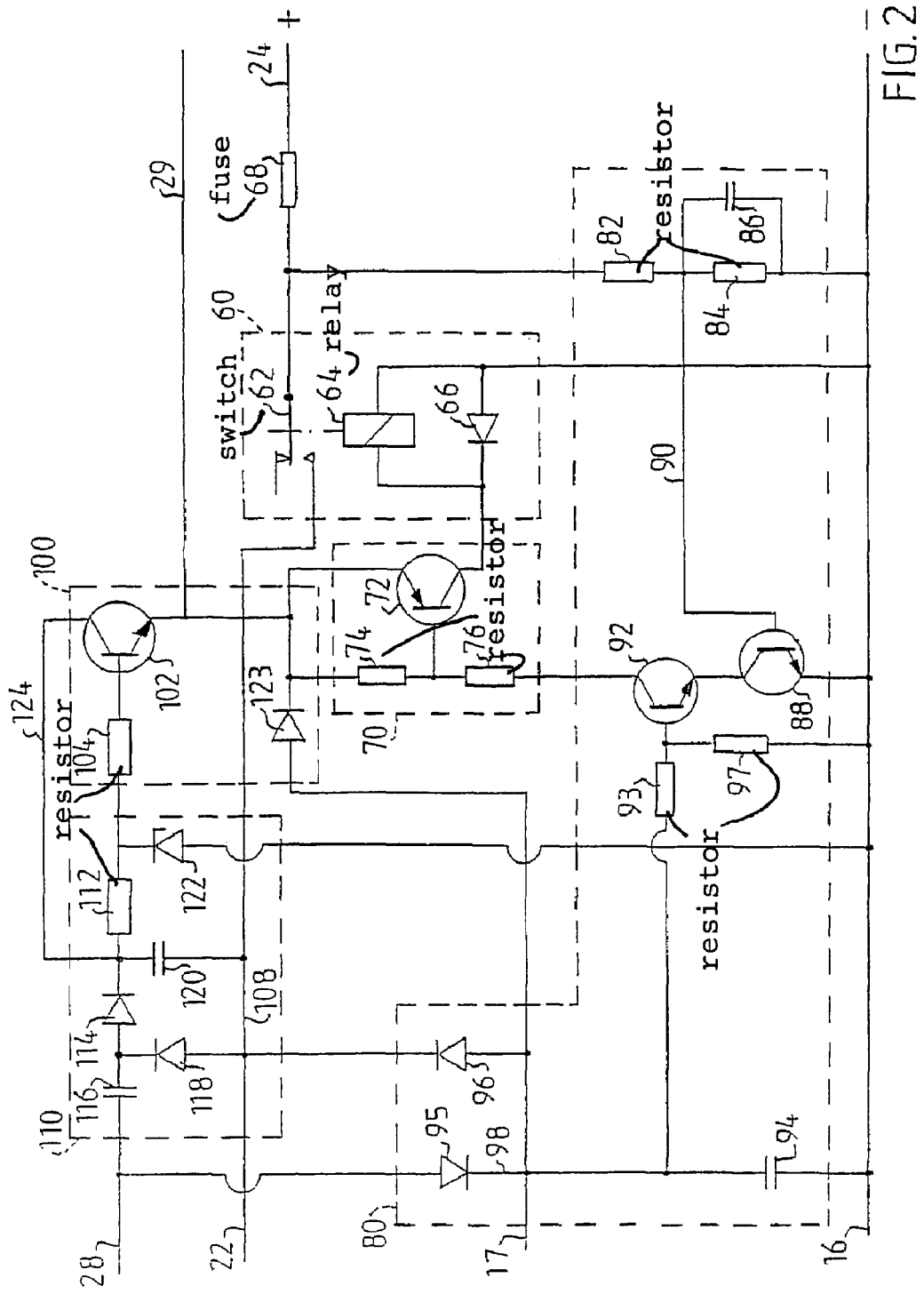

In the following description of an embodiment of the invention, reference will be made to the accompanying drawings of which:

FIG. 1 shows schematically the design of a battery charger according to the invention, and FIG. 2 shows the circuitry for a spark protection with additional functions according to the invention.

DETAILED DESCRIPTION OF THE INVENTION

An example of a battery charger comprising the present invention is shown in FIG. 1. It comprises a primary switched battery charger 10 of fly-back type, which is known as such for a man skilled in the art and will not be explained in detail.

It is arranged with power supply connection means 12 for power supply and is provided with two output lines 14, 16. One of the lines 14 is connected to a rectifier 18, which in turn is connected to a spark protection circuit 20 via a line 22. The spark protection circuit will be described in more detail below. The spark protection circuit is arranged with an output line 24 for connection to one of the terminals of a battery 26. The other output line 16 is arranged for connection to the other of the terminal of the battery.

The output line 14 from the battery charger is arranged with a branch line 28 and separately connected to the spark protection circuit 20. A voltage line 29 is connected between the spark protection unit 20 and the voltage feed control and regulation circuit 34. An output line 36 from the voltage feed circuit is connected to a control circuit 38. Two input lines 40 and 42 to the control circuit 38 are respectively connected to the battery connection lines 24 and 16 for voltage feedback. An input line 43 for current feedback is arranged between the battery connection line 16 an the control circuit 38.

The line 17 for the internal supply voltage is connected to the circuit for maintaining voltage is branched and connected to a circuit for maintaining voltage 50, which is a voltage comparator for supervising the internal supply voltage on line 17. Preferably, the internal voltage is not allowed to drop below 7V. This circuit is in turn arranged with a signal line 52 connected to a feedback circuit 54. The control circuit 38 is also connected to the feedback circuit 54 via a line 56. The feedback circuit is in turn connected to the battery charger 10 via a line 58. By signal line 52 to the feedback circuit 54 the main fly-back switch power supply will be pushed to operate long enough to maintain the internal voltage level. This function is necessary to maintain current feed to relay coil, LED's and control circuits during pulse maintenance charging of the battery.

FIG. 2 shows the spark protection circuit 20 in more detail. It can be divided into the following parts. Part 60 comprises a switch 62 driven by a relay 64 connected in parallel with a switch diode 66. The relay is of normally-open contact frequently used in automotive applications. The switch diode 66 is arranged in order to take care of the inductive current during coil switch off and to protect a relay driver circuit 70.

The output line 24 is arranged with a secondary fuse 68 for emergency protection of the charger in case of for example fire, melting of the insulation of the transformer and such. The driver 70 for the relay, comprising a switching PNP transistor 72 and two base resistors 74, 76 in series, is arranged to the relay, and forms a relay coil driver. The driver obtains its driving power from the secondary circuit of the charger. When the lower end of resistor 76 is driven to a low potential the transistor source current is fed into the coil and the relay will activate.

An AND-circuit 80 with two analogue input is also arranged to the relay for forming the logical condition for the relay to be activated as will be described below, comprising two resistors 82, 84 connected in series between the positive and negative input lines to the battery, where one resistor is connected in parallel with a capacitor 86, one transistor 88 connected with its base to a line 90, which in turn is connected between the resistors. The emitter of the transistor 88 is connected to the negative battery line 16. The collector of the transistor 88 is connected to the emitter of a second transistor 92, where the collector of the transistor 92 is connected to the series of resistors of the driver 70. The base of the transistor 92 is connected over a resistor 93 to the line 17 via a line 98. A further resistor 97 is connected between the base of transistor 92 and the line 16. The line 98 is in turn connected between line 28 and line 16 over a capacitor 94 and a diode 95, where the connection of line 17 and the line from the base of transistor 92 is arranged between the capacitor 94 and the diode 95. Further, a diode 96 is connected to line 98 between the capacitor 94 and the diode 95 and connected to the line 22.

The resistors 82 and 84 sense the battery voltage level. The capacitor 86 is added to filter noise. If the voltage level of the connection point exceeds the base-emitter voltage of the transistor 88, the logical condition for a connected battery is fulfilled. The switch diodes 95 and 96, together with the capacitor 94, work like a simple mains power supply detector. When the main flyback switching power starts to operate as a result of the mains being connected to the wall, the voltage will rise over the capacitor 94. If the mains supply is disconnected this voltage will drop rapidly, independent of the battery voltage and will force to deactivate the relay coil. If the voltage level on the base line of transistor 92 exceeds the base-emitter voltage and the collector-emitter voltage of transistor 88, the transistor 88 starts to drain current from the resistor 74 in the relay driver circuit 70. The voltage from the mains detector also operates as an internal supply voltage on line 17.

A support circuit 100 is arranged for connection/de-connection of auxiliary energy comprising a transistor 102 connected with its emitter to the emitter of the driver transistor 72. The voltage line 29 is connected to the connection between the transistors 72 and 102. The base of the transistor is connected to a resistor 104. The transistor 102 and resistor 104 form a serial voltage regulator and will start to feed current to the relay driver if the emitter voltage level on the transistor 102 drops below the reference voltage level over a zener diode 122 connected between the line 16 and the resistor 104. This function will guarantee that the relay coil always has enough power to operate properly. The output from the serial regulator is connected to line 29 and is used to feed the control and regulation power supply.

A support circuit 110 for generating and stabilising the auxiliary energy is connected to the support circuit for connection/de-connection comprising a resistor 112 connected in series with the resistor of the support circuit 100, a switch diode 1 14 and a pulse capacitor 116, and then to the charger. The positive line 108 coming from the charger is connected to the switch 62, and is in the support circuit connected with a switch diode 118 between its switch diode 114 and pulse capacitor 116, a pulse capacitor 120 between the diode 114 and the resistor 112, and the zener diode 122. A branch 124 is connected between the connection of the capacitor 120 and the collector of the transistor 102. The pulse capacitors 116 and 120 together with the switch diodes 118 and 114 form a charge pump circuit that will create a voltage of 15V to 90V depending on the current source from the circuit and the main fly-back switch power working level. The selection of the capacitor value is carefully done in a way to introduce enough impedance into the circuit to not overload the support switch 100 but still deliver enough power at any time. A reference voltage is created with the resistor 112 and the zener diode 122. For a nominal 12V relay this reference voltage is chosen to 10V.

The function of the device according to the invention is as follows. The spark protection functions to prevent the occurrence of sparks by the AND-circuit. If there is power from the power supply and from the battery, in that the device detects a voltage from the power supply and a positive voltage over a certain threshold value from the battery then the driver activates the relay and the switch is closed, connecting the positive line with the output line 24, thereby connecting the charger to the battery. The threshold value of the voltage from the battery can be chosen by choosing different values of the components in the AND-circuit, for example a minimum voltage of 1,5 V. The value of course depends on the nominal value of the battery and the application. By changing the ratio between resistor 82 and 84 the minimum threshold voltage level can be altered.

If the power supply should be broken, the condition that there is a voltage from the power supply is not present for the AND-circuit, with the result that the relay breaks the connection of the switch. Thereby the battery is prevented from being drained by the charger.

If the battery voltage should decrease to such an extent that the voltage of the spool of the relay is in danger of becoming lower than the holding voltage, the auxiliary energy is switched in by the transistor 102 into the support circuit 100. The minimum voltage level for the relay coil is set by the zener diode 122. With this design the driving capability of the relay spool is maintained theoretically down to 0 V of the battery.

The spark protection is obtained in that the relay closes only if both the battery and the power supply are connected to the charger. This design also enables protection against switching of terminals since the condition that there should be a positive voltage from the battery is not fulfilled, thereby preventing the switch from closing. As an extra safety precaution the positive line is provided with a fuse. This does not activate due to switching of terminals, since the device so quickly detects this and breaks the switch, but is merely an emergency protection should the charger malfunction due to fire, damaged insulation of the transformer and such.

The design also prevents short-circuiting of the connections to the battery since the condition that there should be a positive voltage from the battery is not fulfilled, because the terminal voltage becomes close to zero, thereby breaking the connection of the switch.

It is to be understood that the embodiment described above and shown in the drawing is to be regarded as a non-limiting example of the invention and that it could be modified in several ways within the scope of the appended claims.

As an example, many of the functions described above may be obtained and carried out by suitable software comprised in a micro-chip or the like data carrier.

What is claimed is:

1. Device for a battery charger, comprising:
    a first connection means (14, 16) connected to the output lines of the charger, and
    a second connection means (16, 24) for connection to the terminals of a battery to be charged, the second connection means comprising
    first voltage detection means for detecting a voltage over the output lines of the charger,
    second voltage detection means (80) for detecting a positive voltage over the terminals of the connected battery,
    a switch means (60) for connecting at least one of the output lines of the charger to the terminals of the battery, and
    a switch activating means (70) arranged to said first and second voltage detection means and configured for activating the switch means when both a voltage is detected over the output lines of the charger and a positive voltage is detected over the terminals of the connected battery, the activation of the switch means connecting the at least one of the output lines of the charger to the terminals of the battery and thereby connecting the charger to the battery.

2. Device according to claim 1, characterised in that said switch activating means comprises a relay (64) and an AND-circuit, which AND-circuit forms a logical condition for activating said relay.

3. Device according to claim 2, characterised in that the second connection means further comprises a driver (70) for said relay, which driver obtains its driving power from a secondary circuit of the charger.

4. Device according to claim 1, characterised in that the second connection means further comprises a support circuit (100) capable of providing auxiliary energy should the battery voltage decrease below a certain threshold value.

5. Device according to claim 4, characterised in that the second connection means further comprises a support circuit (110) capable of generating and stabilising said auxiliary energy.

6. Device according to claim 2, characterised in that the second connection means further comprises a support circuit (100) capable of providing auxiliary energy should the battery voltage decrease below a certain threshold value.

7. Device according to claim 6, characterised in that the second connection means further comprises a support circuit (110) capable of generating and stabilising said auxiliary energy.

8. Device according to claim 1, wherein, upon the first voltage detecting means detecting a loss of voltage over the charger output lines, the switch means disconnects the at least one of the output lines from the terminals of the battery.

9. A battery charger device, comprising:
    a battery charger with output terminals (14, 16); and
    a connection means, connected to the battery charger output lines (14, 16), with connections (24, 16) for connection to battery terminals (26, 16) of a battery to be charged, the connection means comprising
    a first voltage detecting means for detecting a voltage over the battery charger output lines (14, 16),
    a second voltage detecting means (80) for detecting a positive battery voltage over the battery terminals (26, 16) of the connected battery,
    a switch means (60) for connecting at least one of the battery charger output lines (14) to the battery terminals (26), and
    a switch activating means (70) arranged to the first and second voltage detection means and configured for activating the switch means only when detecting both i) a voltage is detected, by the first voltage detecting means, over the battery charger output lines and ii) a positive battery voltage is detected, by the second voltage detecting means, over the battery terminals of the connected battery, the activation of the switch means connecting the at least one of the battery charger output lines to the battery terminals and thereby connecting the battery charger to the battery, wherein,
    upon the first voltage detecting means detecting a loss of voltage over the battery charger output lines, the switch means disconnects the at least one of the battery charger output lines from the battery terminals.

10. A battery charger device, comprising:
    a primary switched battery charger (10) with a first output line (14) and a second output line (16);
    a rectifier (18) connected to the first output line of the battery charger;
    a spark protection circuit (20), connected to an output (22) of the rectifier and to the first output line (14) of the battery charger as inputs to the spark protection circuit, with a first output line (24) for connection to a first terminal of a battery to be charged;
    the second output line (16) of the battery charger for connection to a second terminal of the battery;

a voltage feed control and regulation circuit (34) with an input (29) from the spark protection circuit;

a control circuit (38) with a first input (36) from the voltage feed control and regulation circuit, a second input (40) from the first output line (24) of the spark protection circuit, a third input (42) from the first output line (16) of the battery charger, the second and third input lines providing a voltage feedback, a fourth input (43) from the first output line (16) of the battery charger for current feedback;

a voltage supervision and maintenance circuit (50) with an internal supply voltage input (17) from the spark protection circuit; and a feedback circuit (54) with a first input (52) from an output of the voltage supervision and maintenance circuit (50), a second input (56) from an output of the control circuit (38), and an output (58) connected to the battery charger.

* * * * *